(12) United States Patent
Nishiwaki

(10) Patent No.: US 7,431,233 B2
(45) Date of Patent: Oct. 7, 2008

(54) TAPE CARTRIDGE

(75) Inventor: Toshiro Nishiwaki, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 181 days.

(21) Appl. No.: 11/401,251

(22) Filed: Apr. 11, 2006

(65) Prior Publication Data
US 2006/0226272 A1    Oct. 12, 2006

(30) Foreign Application Priority Data
Apr. 12, 2005   (JP)   ............... 2005-114539

(51) Int. Cl.
*G11B 23/087*   (2006.01)
(52) U.S. Cl. ................................. 242/347.1
(58) Field of Classification Search ........... 242/347, 242/347.1; 360/93, 95, 96.1, 96.5, 132, 137
See application file for complete search history.

(56) References Cited
FOREIGN PATENT DOCUMENTS

| | | | |
|---|---|---|---|
| DE | 146217 | 1/1981 | |
| JP | 60-109079 | * 6/1985 | ............... 360/93 |
| JP | 60-127584 | * 7/1985 | ............... 360/137 |
| JP | 6-325538 A | 11/1994 | |
| JP | 7-147075 A | 6/1995 | |
| JP | 8-293182 A | 11/1996 | |

* cited by examiner

*Primary Examiner*—William A Rivera
(74) *Attorney, Agent, or Firm*—Birch, Stewart, Kolasch & Birch, LLP

(57) ABSTRACT

There is provided a tape cartridge capable of reliably preventing tight adhesion of a magnetic tape to the back side of a front plate portion of a front cover. A regulation body for preventing adhesion of the tape to the back side of the front plate portion of the front cover is integrally provided in a protruding manner in the region including a tape loading pocket on the front face of a main case. The regulation body includes a plurality of kinds of ribs different in protruding size from the back side. The top end of each rib is convex-curved to have a circular arc cross section. A plurality of kinds of the ribs are disposed in horizontal direction at intervals.

2 Claims, 6 Drawing Sheets

TAPE CARTRIDGE

BACKGROUND OF THE INVENTION

The present invention relates to a tape cartridge having a tape loading pocket in the center of a front face of a main case and a tape protecting front cover provided on the main case for covering the outer front face of the pocket.

In this type of tape cartridge, a tape reel incorporated in the main case sometimes rotates improperly upon reception of external impact, and a tape sagging and protruding toward the front face of the case main body adheres tightly to the static-charged back side of the front wall of the front cover.

In the case where such tape adhesion phenomenon occurs, the tape is extracted together with the front wall of the front cover from the tape reel when a tape cartridge is loaded onto a tape deck and the front cover is opened by a upward rotation. Consequently, a so-called jamming phenomenon occurs at the time of tape loading, and this causes the deck inoperable, as well as tape damage and ejection failure of the tape cartridge from the tape deck. Such failure may be eliminated by, for example, forming the front cover from resin materials containing antistatic agents, which increases manufacturing costs of the tape cartridge.

The back side of the front wall of the front cover is generally polished to be a smooth surface, i.e., mirror polished. As a result, a small amount of moisture, if attaching to the back side of the front cover due to the use environment of the tape cartridge, causes the tape to tightly adhere to the back side of the front cover in a similar manner. In this case, this problem cannot be solved simply by forming the front cover from resin materials containing antistatic agents.

In this point of view, the basic purpose of the present invention is to make the back side of the front cover uneven so as to prevent the phenomenon that the tape adheres to the back side of the front cover due to the influence of static charge and moisture. As prior arts to aim a similar purpose, there are JP H8-293182 A (Paragraph No. 0022, FIGS. 5, 12) and JP H7-147075 A (Paragraph No. 0031, FIGS. 2, 6).

In JP H8-293182 A, recess portions having backward openings are formed on the back side of the front wall of the front cover to have a stepped surface, so that a facing distance to the tape is increased for the recess size of the recess portion, which prevents tape adhesion to the back side of the front wall.

In JP H7-147075 A, protruding portions are formed on the back side of the front wall to decrease a contact area between the tape and the back side in order to prevent tape adhesion. The protruding portions in this case are formed to have a square cross section having a flat top end face. The protruding portions may be formed to have a triangle cross section (see FIG. 12 in JP H8-293182 A and FIG. 2 in JP H7-147075 A).

In the structure disclosed in JP H8-293182 A, when the tape cartridge receives dropping impact and the like, a tape largely sags and protrudes to the inner face of the recess portion, thereby causing the tape to adhere to the inner face of the recess portion. More particularly, in the structure for increasing a facing distance size to the tape by a recess size of the recess portion, when the tape sags and protrudes beyond the facing distance size, the tape is still in danger of adhering to the inner face of the recess. In the structure disclosed in JP H7-147075 A, if an area of the flat top end face is large, then the tape is in danger of adhering to the top end face. In the structure that the protruding portion has an angular corner section such as square cross sections and triangle cross sections, the tape is likely to suffer a damage by touching the protruding portion and cause recording and reproducing failure.

SUMMARY OF THE INVENTION

An object of the present invention is to provide a tape cartridge structured to have a regulation body integrally provided in a protruding manner on the back side of a front plate portion of a front cover for preventing tape adhesion, the tape cartridge reliably preventing tape damage while surely preventing adhesion of a tape to the back side of the front plate portion of the front cover.

In the present invention, as shown in FIG. 2 and FIG. 3, there is provided a tape cartridge, including: a tape loading pocket 5 formed in a center of a front face of a main case 1; and a tape protecting front cover 7 provided on the main case 1 for covering an outer front face of the pocket 5, wherein as shown in FIG. 1 and FIG. 5, a regulation body 15 for preventing adhesion of a tape 2 is integrally formed in a protruding manner in a region facing the pocket 5 on a back side 13 of a front plate portion 9 of the front cover 7 facing a magnetic layer of the tape 2, wherein the regulation body 15 includes a plurality of ribs extending in vertical direction and disposed in horizontal direction at intervals, and wherein a top end face of each rib is convex-curved to have a circular arc cross section.

The regulation body 15 may include a plurality of kinds of ribs different in protruding size from the back side 13 of the front plate portion 9 of the front cover 7, and a plurality of kinds of the ribs may be disposed in horizontal direction at intervals.

In the present invention, a plurality of ribs extending in vertical direction are protruded on the back side 13 of the front plate portion 9 of the front cover 7 facing the magnetic layer of the tape 2, and therefore compared to the conventional structure in which the back side 13 is flat, a contact area between the back side 13 and the magnetic layer face of the tape 2 is minimized and tight adhesion of the tape 2 to the back side 13 can effectively be prevented. Furthermore, the top end of each rib is convex-curved to have a circular arc cross section, and therefore compared to the ribs having a square cross section with a flat top end face as shown in FIG. 5 in JP H7-147075 A, a contact area between the ribs and the magnetic layer face of the tape 2 is considerably reduced, which makes it possible to efficiently prevent tight adhesion of the tape 2 to the ribs. Damage of the magnetic layer of the tape 2 is also prevented.

When a plurality of kinds of ribs different in protruding size from the back side 13 of the front cover 7 are disposed at intervals, and the front cover 7 is weakly charged with static charge, only the ribs with a large protruding size from the back side 13 receives the magnetic layer face of the tape 2, and movement of the tape 2 toward the back side 13 is regulated (see FIG. 6A). According to this structure compared to the structure in which a plurality of ribs with an identical protruding size are arrayed, a contact area between the tape and the rib can be reduced, and this, in addition to the top end of each rib being convex-shaped to have a circular arc cross section, makes it possible to effectively prevent the tape 2 from adhering to the ribs having a large protruding size. When the front cover 7 is charged with a large amount of static charge, ribs having a small protruding size disposed between the ribs having a large protruding size can receive the magnetic layer face of the tape 2 which is induced to the back side 13 and tends to adhere thereto, so that adhesion of the tape 2 to the back side 13 can be prevented (see FIG. 6B).

With a simple structure in which a plurality of ribs different in height are integrally formed on the back side 13 of the front cover 7, adhesion of the tape 2 can reliably be prevented, and therefore a high quality tape cartridge can be provided at a low cost without the increase in manufacturing cost. Unlike the case of forming the front cover from resin containing antistatic agents, considerable increase in material cost of the front cover 7 can be avoided.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
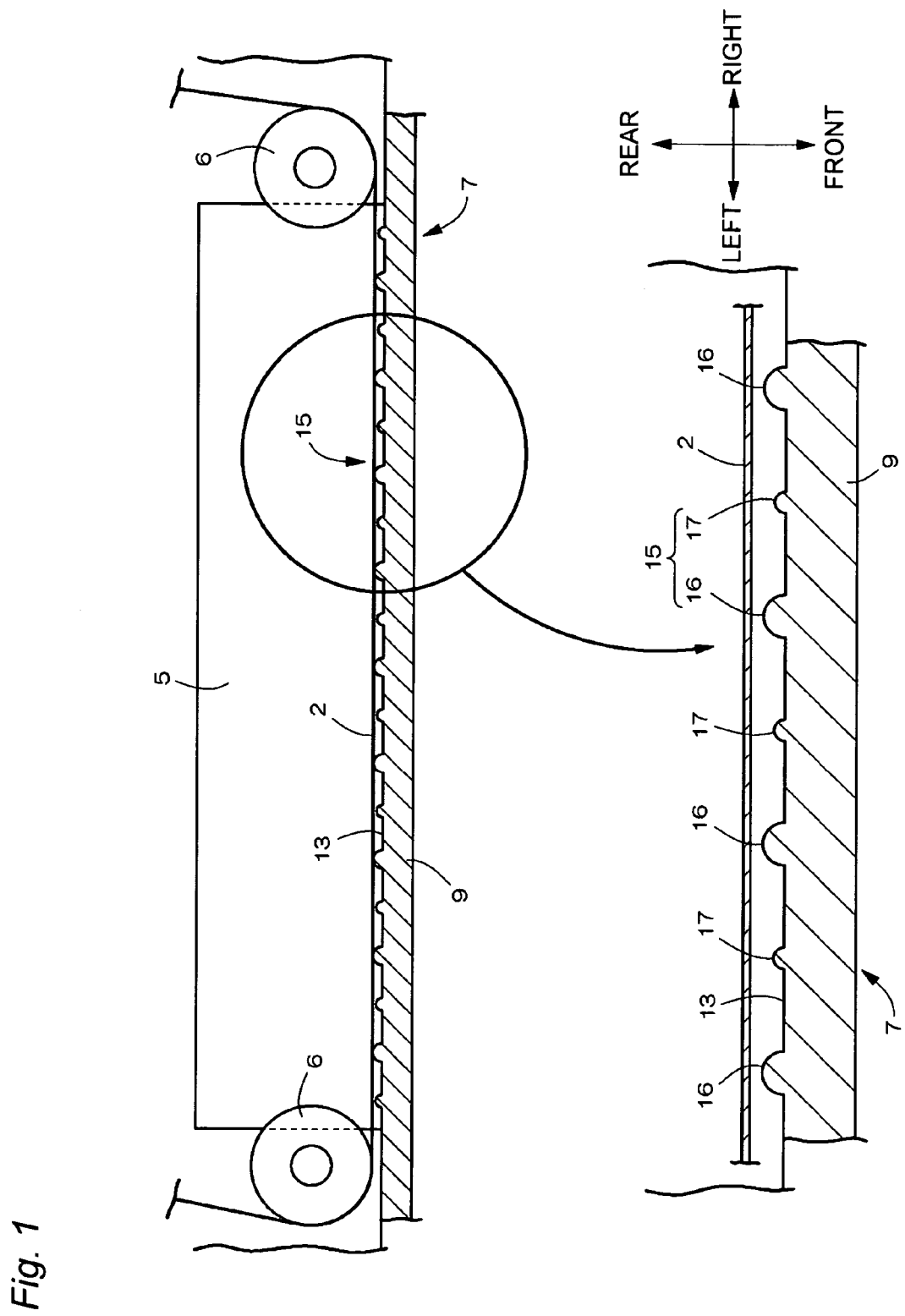
FIG. 1 is a traverse plane view showing major parts of a tape cartridge.

The drawings show embodiments in which a tape cartridge is applied to DDSs (digital data storages) for computer backup, the tape cartridge being composed of a pair of left-side and right-side tape reels 3, 3, for taking up a magnetic tape (tape) 2 and a reel lock mechanism placed inside a hollow box-like case body 1 formed by combining upper and lower cases 1a, 1b in a lid coupling state.

In the center of the front face of the case body 1, a tape loading pocket 5 whose lower face and front face open is formed in a recessed form. The tape 2 unreeled from one tape reel 3 is guided to move to the other tape reel 3 through a pair of left-side and right-side tape guides 6, 6. The tape guides 6, 6 are provided on the front left side and the front right side of the pocket 5, and the tape 2, when unused, is retained in the state of passing transversely across the front face of the pocket 5 with a magnetic layer face facing outward.

When the tape 2 is unused, the front face and the upper face of the pocket 5 are covered with the front cover 7 and the lower face side thereof is covered with a shutter 8 in order to protect the tape 2 facing outside the front face of the pocket 5.

Figure 2:
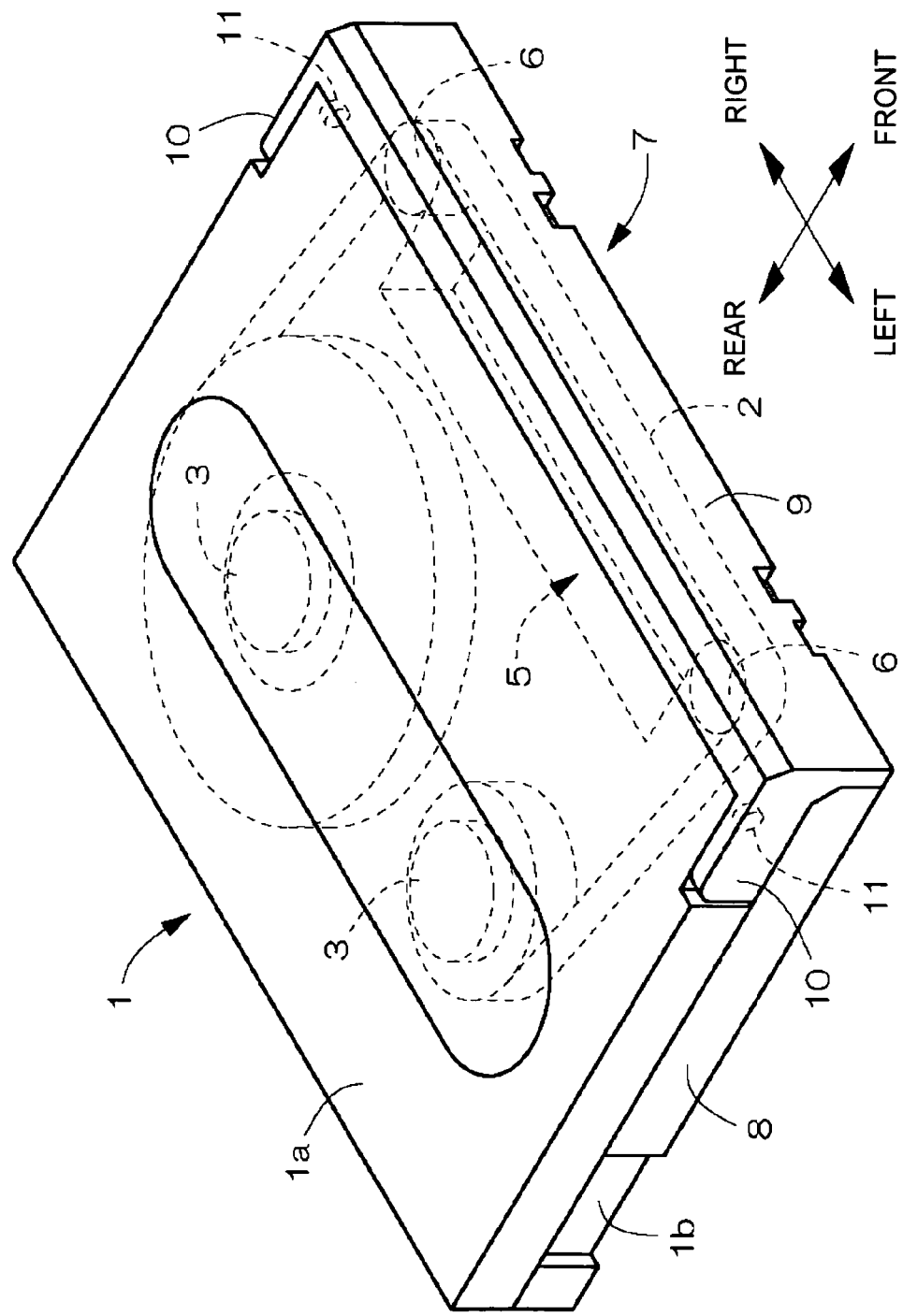
FIG. 2 is a perspective view of the tape cartridge.
Figure 3:
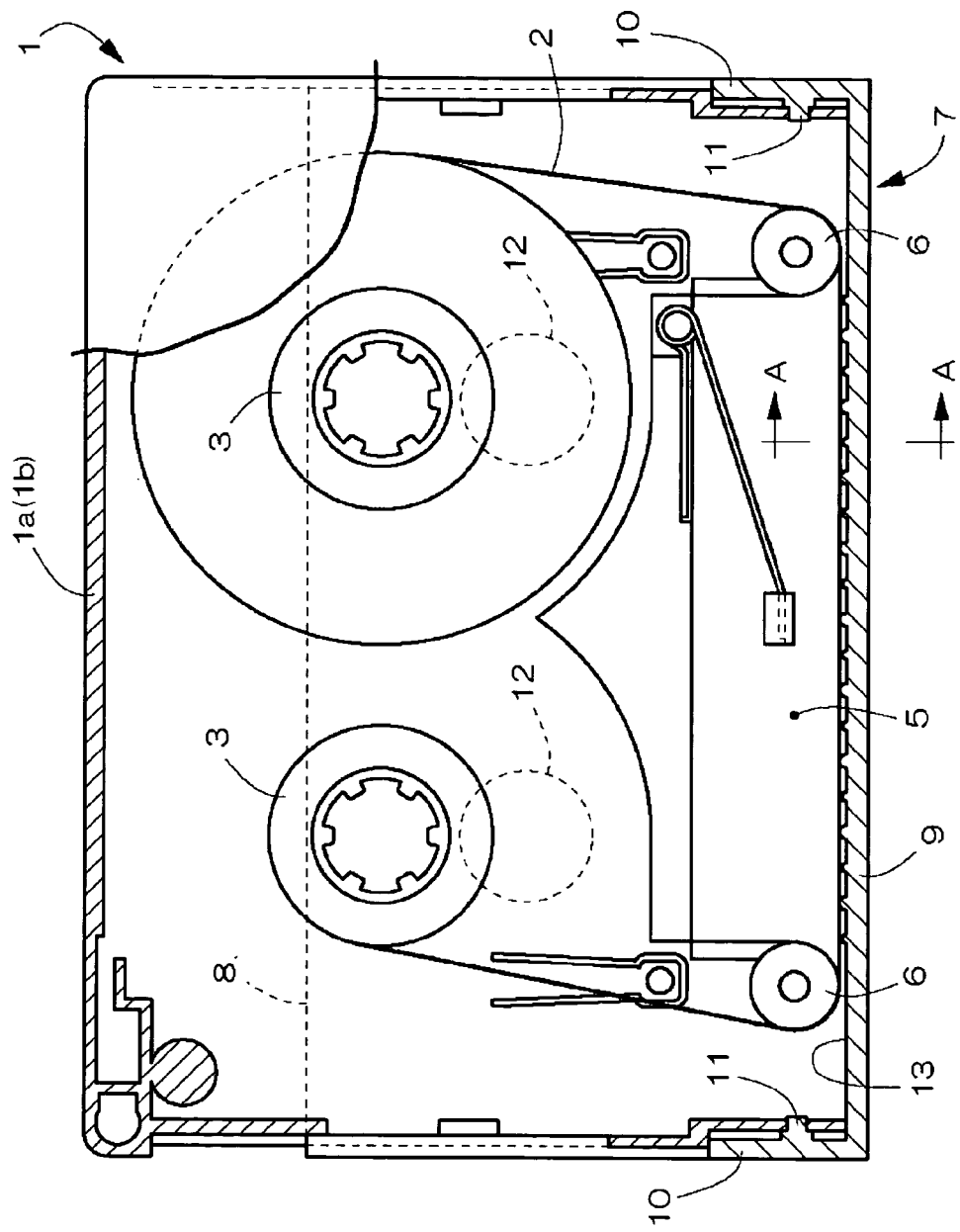
FIG. 3 is a plane view showing the inside of the tape cartridge.

The front cover 7 in FIG. 2 and FIG. 3 is a plastic molding including a front plate portion 9 covering a front side of the case body 1 including the open front face of the pocket 5 over the horizontal direction and coupling pieces 10 integrally provided in such a way as to extend from the left and right ends of the front plate portion 9 to the rear of the case body 1. Spindles 11 facing each other in the inward direction are provided in a protruding manner on the left and right coupling pieces 10 and these Spindles 11 are rotatably supported by spindle holes provided on the left-side and right-side walls of the upper case 1a. With this, the front cover 7 can be operated between a closed posture blocking the pocket 5 shown by a solid line in FIG. 4 and an opened posture positioned on the upper side above the upper face of the pocket 5 for opening the open front face of the pocket 5 shown by a virtual line. It is to be noted that the front cover 7 is rotatably biased so as to close by an unshown torsion coil spring mounted on one spindle 11, and is received and supported by the shutter 8 so as to define the closed posture.

In FIG. 2, the shutter 8, which is placed on the lower face of the case body 1, is supported by the case body 1 so as to be slidable in front and rear directions, and when not in use, the shutter 8 is locked and retained by an unshown lock nail formed on the case body 1 so that the shutter 8 is not opened. The shutter 8 when not in use covers the lower face side of the pocket 5 and also covers drive shaft insertion holes which are open to the lower face of the case body 1 and which correspond to the mounting positions of the tape reels 3, 3. Through unlocking operation of the lock nail and opening operation of the shutter 8 toward the rear of the case body 1, the pocket 5 and the drive shaft insertion holes are opened. In FIG. 3, reference numeral 12 denotes an aperture for opening the drive shaft insertion hole.

In FIG. 1, a regulation body 15 for preventing adhesion of the tape 2 is integrally provided in a protruding manner at least in the region facing the pocket 5 on the back side 13 of the front plate portion 9 of the front cover 7 facing the magnetic layer face of the tape 2.

Figure 4:
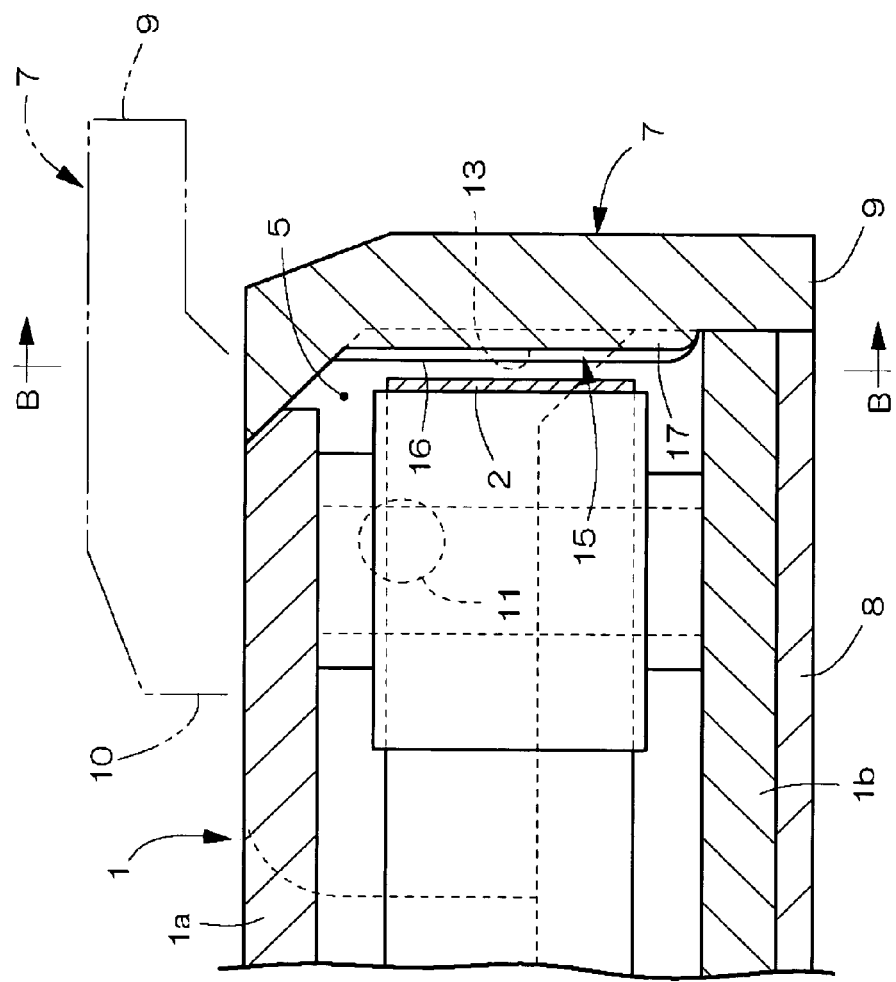
FIG. 4 is a cross sectional view taken along line A-A in FIG. 3.
Figure 5:
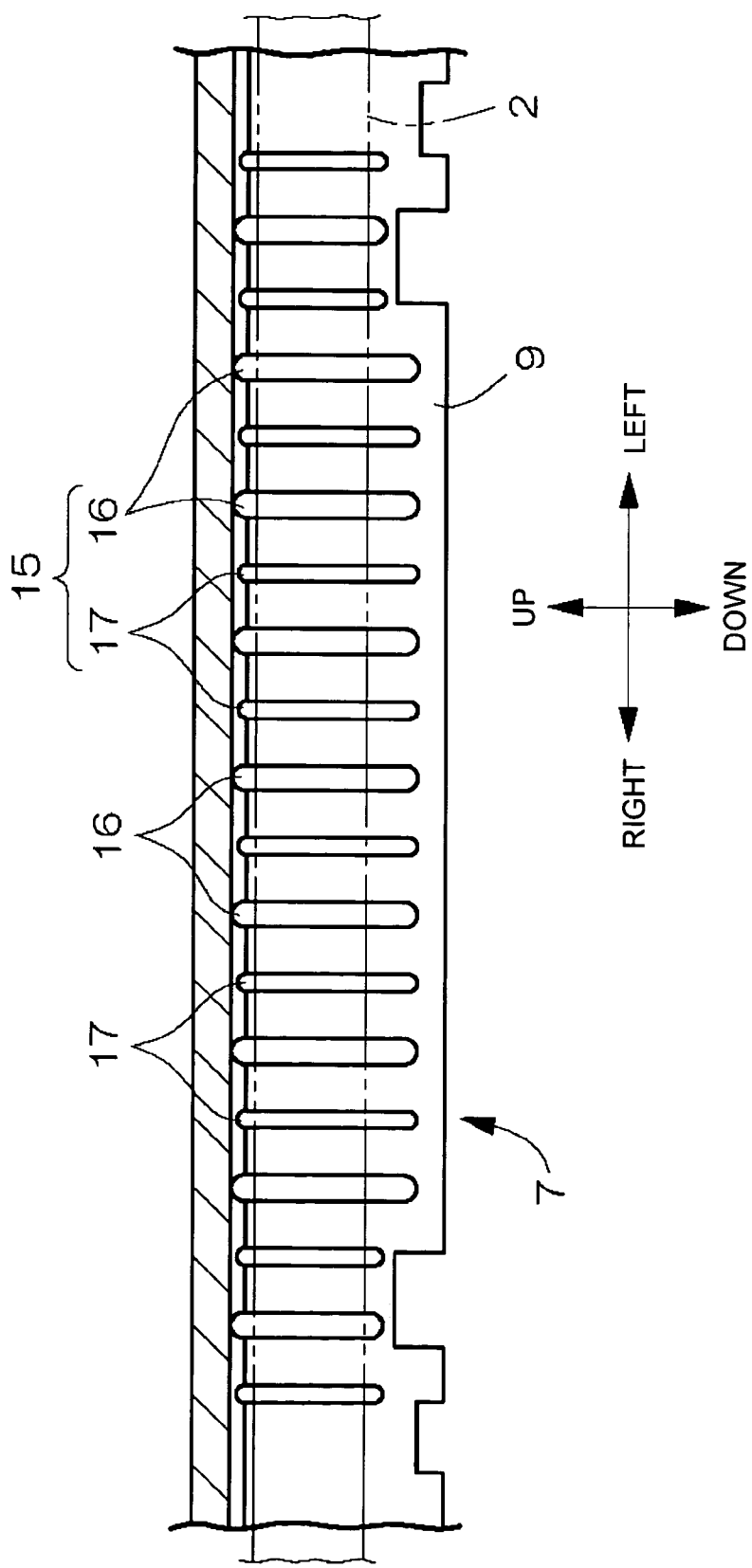
FIG. 5 is a cross sectional view taken along line B-B in FIG. 4.

In FIG. 5, the regulation body 15 includes large and small two kinds of vertical ribs 16, 17 different in inward protruding size from the back side 13 of the front plate portion 9. The top end section of each of the ribs 16, 17 is convex-shaped to have a circular arc cross section. These large and small two kinds of ribs 16, 17 are disposed alternately at a constant interval of e.g., 2.4 mm in horizontal direction, and when the front cover 7 is put in the closed posture as shown in FIG. 4, the ribs proximately face the magnetic layer face of the tape 2 positioned on the front face of the pocket 5 in the state of being hung between the tape guides 6, 6. In other words, the protruding size of the large ribs 16 is regulated such that when the front cover 7 is in the closed posture, the large ribs 16 proximately face with appropriate gaps or come into contact with the magnetic layer face of the tape 2.

The preferable range of the protruding size of the large ribs 16 is from 0.15 mm to 0.3 mm. This size range is preferable because if the size is smaller than 0.15 mm, the adhesion prevention effect is diminished, whereas if the size is larger than 0.3 mm, then the tape 2 is tightly pressed by the large ribs 16 when the front cover 7 is in the closed posture, and this easily causes tape damage. The protruding size of the small ribs 17 is necessarily smaller than that of the large ribs 16, and its preferable range is from 0.05 mm to 0.15 mm. This size range is preferable because if the size is smaller than 0.05 mm, the protruding size from the back side 13 is too small to achieve sufficient adhesion prevention effect, whereas if the size is larger than 0.15 mm, then a difference in protruding size from the large ribs 16 whose protruding size are set to a relative small value within the above-mentioned preferable range is diminished, and this also reduces the adhesion prevention effect due to the protruding sizes of all ribs including the large ribs 16 being small. The radius R of the circular arc cross section of the large ribs 16 and the small ribs 17 should preferably be in the range from 0.1 mm to 2.0 mm. If the radius R is smaller than 0.1 mm, it is likely to damage the tape 2 with the top ends of the ribs 16, 17, whereas if the radius R is larger than 2.0 mm, the rib width is too increased, and the tape 2 is likely to wind and adhere on or around the top ends of the ribs 16, 17 so that the adhesion of the tape 2 to the back side 13 of the front plate portion 9 of the front cover 7 becomes easily caused.

In one example of the present embodiment, the protruding size of the large ribs 16 is 0.25 mm, the protruding size of the small ribs 17 is 0.1 mm, the radius of the circular arc cross section of the large ribs 16 is 0.6 mm, and the radius of the circular arc cross section of the small ribs 17 is 0.5 mm.

Thus, a plurality of ribs 16, 17 are provided in a protruding manner on the back side 13 of the front plate portion 9 of the front cover 7, so that compared to the structure in which the back side 13 is flat, a contact area between the back side 13 and the tape 2 is minimized and tight adhesion of the tape 2 to the back side 13 can effectively be prevented. Since the top end of each of the ribs 16, 17 is convex-curved to have a circular arc cross section, a contact area between the ribs 16, 17 and the tape 2 is considerably reduced, which also makes it possible to efficiently prevent tight adhesion of the tape 2 to the ribs 16, 17.

Therefore, when the tape cartridge is loaded onto the tape deck and the front cover 7 is opened upward, the tape 2 is not accidentally extracted by the front cover 7. Damage of the tape 2 caused by the contact with the ribs 16, 17 can also be prevented effectively.

Figure 6A:
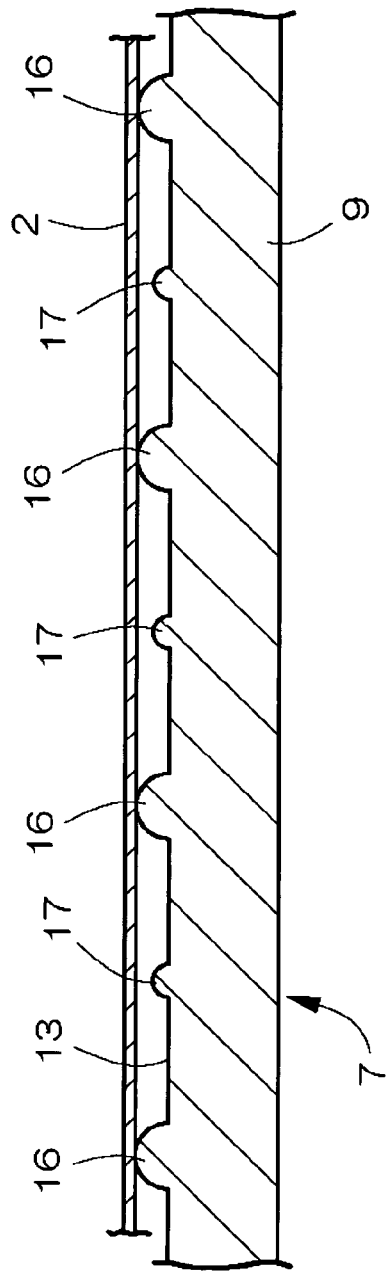
FIG. 6 is a traverse plane view showing major parts of the tape cartridge for explaining the function of a regulation body.

When large and small two kinds of ribs 16, 17 different in protruding size from the back side 13 of the front cover 7 are disposed alternately, and the front cover 7 is weakly charged with static charge, only the ribs 16 with a large protruding size from the back side 13 receives the tape 2 (see FIG. 6A).

Figure 6B:
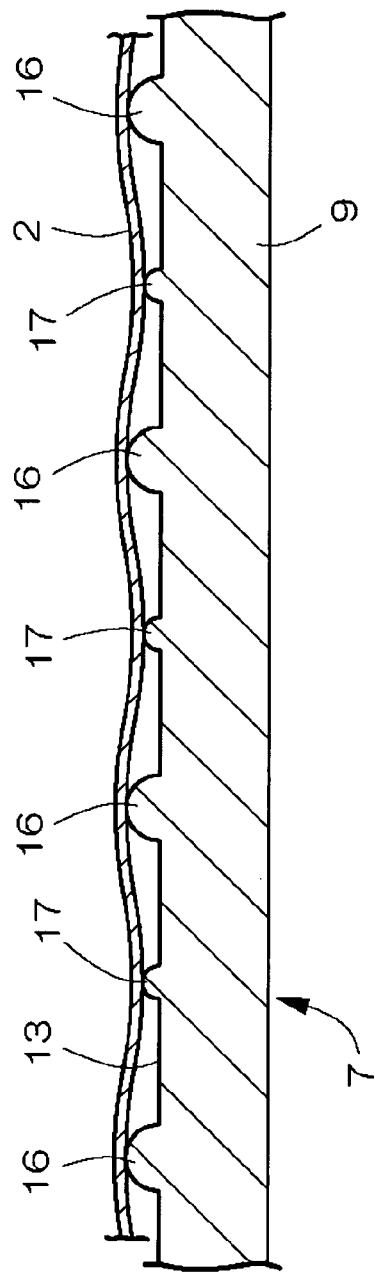

When the front cover 7 is charged with a large amount of static charge, the small ribs 17 having a small protruding size disposed between the adjacent large ribs 16, 16 can receive the tape 2 which is induced to the back side 13 and tends to adhere thereto, so that adhesion of the tape 2 to the back side 13 can be prevented (see FIG. 6B). Therefore, even in the case where the front cover 7 is charged with a large amount of static charge, adhesion of the tape 2 to the back side 13 can reliably be prevented with a simple structure.

The tape cartridge of the present invention is not limited to the above-described embodiment, and may include varied modifications. For example, though the large rib 16 and the small rib 17 are alternately arrayed in the horizontal direction, it is not limited thereto, the large rib 16 and the small rib 17 may be arrayed in a different order such as the large rib 16, the large rib 16 and the small rib 17, or the small rib 17, the small rib 17 and the large rib 16. Also, though the ribs 16, 17 is disposed on the back side 13 of the front plate portion 13 of the front cover 7 at a constant interval of e.g., 2.4 mm, the interval between two rib adjacent to each other is not necessarily required to be constant.

Without being limited to DDS-type tape cartridges, the present invention is equally applicable to video cassettes, music tape cartridges and single reel cartridges.

Although the present invention has been fully described by way of examples with reference to the accompanying drawings, it is to be noted that various changes and modifications will be apparent to those skilled in the art. Therefore, unless otherwise such changes and modifications depart from the spirit and the scope of the present invention, they should be construed as being included therein.

What is claimed is:

1. A tape cartridge, comprising:
    a tape loading pocket formed in a center of a front face of a case body; and a tape protecting front cover provided on the case body for covering an outer front face of the pocket,
    wherein a regulation body for preventing adhesion of the tape is integrally provided in a protruding manner in a region facing the pocket on a back side of a front plate portion of the front cover facing a magnetic layer face of a tape,
    wherein the regulation body includes a plurality of ribs extending in vertical direction and disposed in horizontal direction at intervals,
    wherein a top end face of each rib is convex-curved to have a circular arc cross section,
    wherein the regulation body includes a plurality of kinds of ribs different in protruding size from the back side of the front plate portion of the front cover, and
    wherein a plurality of kinds of the ribs are disposed in horizontal direction at intervals.

2. The tape cartridge according to claim 1,
    wherein the regulation body includes large and small ribs different in protruding size from the back side of the front plate portion of the front cover, and
    wherein the ribs are disposed in horizontal direction at a constant interval.

* * * * *